(12) United States Patent
Mayer-Ullmann

(10) Patent No.: US 7,844,462 B2
(45) Date of Patent: Nov. 30, 2010

(54) SPATIAL SOUND GENERATION FOR SCREEN NAVIGATION

(75) Inventor: Dietrich Mayer-Ullmann, Ilvvesheim (DE)

(73) Assignee: SAP AG, Walldorf (DE)

( * ) Notice: Subject to any disclaimer, the term of this patent is extended or adjusted under 35 U.S.C. 154(b) by 932 days.

(21) Appl. No.: 11/701,222

(22) Filed: Feb. 1, 2007

(65) Prior Publication Data

US 2008/0189115 A1 Aug. 7, 2008

(51) Int. Cl.
*G10L 13/08* (2006.01)

(52) U.S. Cl. .................. 704/260; 704/270; 345/157

(58) Field of Classification Search ............ 704/260, 704/270, 270.1, 275; 345/156, 157
See application file for complete search history.

(56) References Cited

U.S. PATENT DOCUMENTS

| | | | |
|---|---|---|---|
| 5,884,266 A * | 3/1999 | Dvorak | 704/270.1 |
| 6,018,710 A * | 1/2000 | Wynblatt et al. | 704/260 |
| 6,085,161 A * | 7/2000 | MacKenty et al. | 704/270 |
| 6,282,511 B1 * | 8/2001 | Mayer | 704/270 |
| 6,330,486 B1 * | 12/2001 | Padula | 700/94 |
| 6,564,186 B1 * | 5/2003 | Kiraly et al. | 704/260 |
| 7,290,216 B1 * | 10/2007 | Kawahara et al. | 715/762 |
| 2005/0222844 A1 * | 10/2005 | Kawahara et al. | 704/260 |

OTHER PUBLICATIONS

Larson, Jim A., "Introduction And Overview Of W3C Speech Interface Framework", http://www.w3.org/TR/2000/WD-voice-intro-20001204, (Dec. 4, 2000), 14 pages.

* cited by examiner

*Primary Examiner*—Abul Azad
(74) *Attorney, Agent, or Firm*—Brake Hughes Bellermann LLP

(57) ABSTRACT

Methods and apparatus for spatial sound generation for screen navigation are disclosed. An example method for spatial sound generation comprises receiving an indication of a cursor focus position, where the cursor focus position corresponds with a location on a display device. The example method further includes receiving speech information associated with an object situated at the location on the display device. The example method also includes modifying the speech information based on the indication of the cursor focus position such that the modified speech information spatially represents the location on the display device.

18 Claims, 2 Drawing Sheets

SPATIAL SOUND GENERATION FOR SCREEN NAVIGATION

TECHNICAL FIELD

This description relates to improving accessibility to visually displayed information in computer displays for visually impaired persons.

BACKGROUND

With the growth of the Internet, the computing industry and telecommunications, the amount of content available to consumers is continually increasing. Because much of this content is visual, it is desirable to provide techniques for such content to be accessible to persons with disabilities, such as visually impaired or blind persons. One approach that is used to provide such accessibility is to provide audio information to such visually impaired users to allow them to build mental images of displays of such content (e.g., web pages). Current approaches, however, may require that visually impaired or blind users remember the relative locations of objects included in such content by rote memory while navigating the content. Other approaches are dependent on the resolution at which the content is displayed and the particular arrangement of the content. Such approaches may require significant revisions to the content for different display devices, or if any modification to the content is made, or if the content is reused in an arrangement that is different than the original arrangement.

SUMMARY

According to one general aspect, an example method for spatial sound generation may include receiving an indication of a cursor focus position, where the cursor focus position corresponds with a location on a display device. The cursor focus position may be set, for example, by a mouse click or a keyboard stroke. The example method may further include receiving speech information associated with an object situated at the location on the display device. The example method may also include modifying the speech information based on the indication of the cursor focus position such that the modified speech information spatially represents the location on the display device.

According to another general aspect, an example system for spatial sound generation may include a computing device, a display device operationally coupled with the computing device, and a multi-channel sound system operationally coupled with the computing device. In the example system, the computing device may include a storage device having machine readable instructions stored thereon. The instructions, when executed by the computing device, may provide for receiving an indication of a cursor focus position, where the cursor focus position corresponds with a location on the display device. The instructions, when executed, may also provide for receiving speech information associated with an object situated at the location on the display device. In the example system, executing the instructions may further provide for modifying the speech information based on the indication of the cursor focus position such that the modified speech information spatially represents the location on the display device. Still further in the example system; the instructions, when executed, may provide for playing the modified speech information with the multi-channel sound system.

According to another general aspect, an example apparatus may include a machine readable medium having instructions stored thereon. The instructions, when executed by a computing device, may provide for implementing the example method described above.

The details of one or more example implementations are set forth in the accompanying drawings and the description below. Other features will be apparent from the description and drawings, and from the claims.

DETAILED DESCRIPTION

Figure 1:
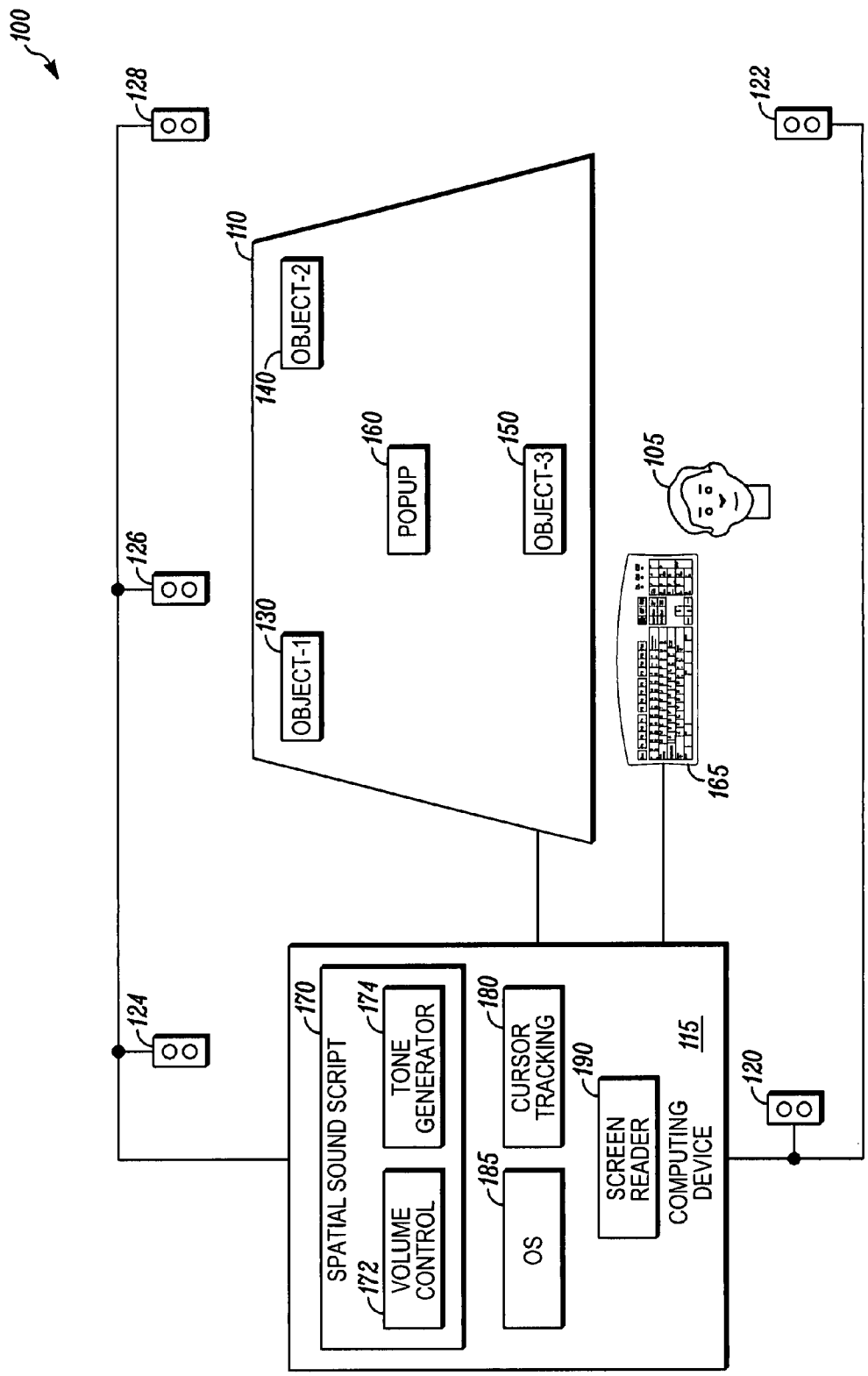
FIG. 1 is a diagram of an example embodiment of a system that may be used to implement spatial sound generation.

FIG. 1 is a diagram of a system 100 that may be used to implement the spatial sound generation techniques described herein. The system 100 may be used by a user 105. User 105 may be a visually impaired user or may be a blind user. The system 100 also includes a display device 110. The display device 110 may be a computer monitor, a television monitor or any other device that may be used to visually render video data. In the system 100, video data may be provided by a computing device 115. The computing device 115 may take any number of forms. For instance, the computing device 115 may be a desktop computer, a laptop computer, a computer server, or a video game console, as just a few examples. The computing device 115 may provide video data to the display device 110, which may then be rendered on the display device 110.

The system 100 further includes a multi-channel sound system. The multi-channel sound system may include speakers, 120, 122, 124, 126 and 128. The multi-channel sound system may also include other components. For instance, the multi-channel sound system may include an amplifier (not shown) that is operationally coupled with the computing device 115 and the speakers 120-128. Such an amplifier may also include a decoder for decoding audio data provided to the amplifier by the computing device 115. Such audio data may include audio data to be played by each of the speakers 120-128. As an alternative, the computing device 115 may include an integrated amplifier/decoder (not shown). Such an amplifier/decoder, for example, may take the form of a sound card included in the computing device 115. In other embodiments, the sound system of the system 100 may be a sound system with fewer or more channels. For instance, a sound system with two or more channels may be used. In systems including a two channel sound system, a three-dimensional (3D) sound card or 3D headphones may be used to provide spatial information to the user 105. In still other embodiments, a single channel sound system may be used, such as is discussed in further detail below.

As shown in FIG. 1, the display device 110 may be used to display various graphical objects, e.g., as part of a graphical user interface (GUI), such as, for example, a browser. Such objects may include, for example, buttons, hyperlinks, tables or menus, among any number of other types of objects. For instance, in the system 100, the display device 110 is used to display a first object 130 (OBJECT-1), a second object 140 (OBJECT-2), a third object 150 (OBJECT-3), and a fourth object 160 (POPUP). The user 105 may navigate between these objects using an input device 165. The input device 165 may take the form of a keyboard, a trackball, a computer mouse, a digitizer pad, or any other appropriate device for navigating content displayed on the display device 110. For instance, the input device 165 may be a keyboard and the user 105 may use the keys of the keyboard to navigate between the objects 130-160 on the display 110.

In the event the user 105 is visually impaired or blind, the example system 100 may be used to provide spatial audio (sound) information to the user 105. For purposes of this disclosure, the user 105 will be assumed to be visually impaired or blind. Such spatial sound information may be played by the sound system (i.e., speakers 120-128) so as to provide auditory indications of the arrangement and location of the objects 130-160 on the display 110, as is described in more detail below. Such spatial sound information may be beneficial to the user 105, as this spatial sound information may assist the user 105 in more readily and easily constructing a mental image of the contents (objects 130-160) of the display 110, thus making the content of the display 110 more easily accessible for the user 105. The content of the display 110 may include, for example, web page content, word processor content, spreadsheet content, or any number of other types of visually displayed content.

Spatial sound information for the content of the display 110 may be generated by the system 100 in any number of ways. It will be appreciated that the embodiments described herein are provided merely by way of example and many other approaches are possible. As one example, the system 100 may produce spatial sound information using a spatial sound generation script 170 that is executed by the computing device 115. The spatial sound generation script 170 may include machine readable instructions, which are executable by a processor of the computing device 115.

These instructions, when executed in the computing device 115, may provide for receiving an indication of a cursor focus position, where the cursor focus position corresponds with a location on the display 110, such as an x-y location. The cursor focus position may also be referred to as cursor location or cursor position. For instance, the cursor may be visually represented by an arrow on the display 100 and the cursor position may take the form of x-y coordinates that correspond with the location of the arrow on the display 110.

Alternatively, the cursor position may be visually indicated by highlighting an object at a current cursor focus position. For instance, if the current cursor focus position is at a location corresponding with the object 130, the object 130 may be highlighted relative the other objects 140-160 on the display 110. As yet another alternative, when providing the display 110 for the user 105, there may not be any visual indication of a current cursor focus position. In such an approach, the computing device 115 may keep track of the current cursor focus position based on the user's 105 navigation of the content on the display 110, yet not provide a visual indication of the current cursor focus position.

The spatial sound generation script (hereafter "script") 170 may receive the current cursor focus position from a cursor tracking software application 180 that is being executed on the computing device 115. Such an application 180 may supply the script 170 with the cursor focus position in response to a query from the script 170. Alternatively, the cursor position tracking application 180 may provide the current cursor focus position to the script 170 in real-time, e.g., each time the cursor focus position changes. As an alternative, the script 170 may receive the current cursor focus position from an operating system 185 running on the computing device 115. The current cursor focus position may be provided to the script 170 by the operating system 185 in similar fashion as the techniques described above for the cursor tracking application 180.

In the system 100, the script may receive speech information that is associated with an object (e.g., one of the objects 130-160) that is situated at the location of a current cursor focus position. For instance, if the user 105 navigates to the object 140 (OBJECT-2) using the input device 165, the script 170 may receive speech information to be used to provide spatial audio information to the user 105 in addition to receiving a cursor focus position of the object 140. The speech information may take any number of forms. For instance, the speech information may be implemented as audio files that are associated with the content of the display 110, such as the object 140 in this example. Such files may be .wav files, .au files, .mp3 files, .wma files, or any number of other audio file formats. The script 170 may interpret the speech information and, based on the location of an object with which the sound information is associated, may add sound files to the speech information or implement any number of sound effects in the sound information (e.g., increased volume, panning, channel mixing and frequency shifting), so as to provide spatial information to the user 105.

Alternatively, the speech information received by the script 170 may be provided by a screen reader 190. The screen reader 190 may be implemented in the computing device 115 and provide the speech information to the script 170 as a result of text-to-speech conversion of text associated with the object at the current cursor focus position, e.g., the object 140. The screen reader 190 may be included in the script 170 or may operate independently of the script 170. The text used for the text-to-speech conversion, for example, may be displayed as part of the object 140. Alternatively, the text may be included in tags associated with the object 140. For instance, if the object 140 is part of a web page being displayed on the display 110, the text used for text-to-speech conversion may be included in HTML-tags that are part of the web page content. These tags, however, may not be displayed as part of the web page on the display 110.

As an example, the object 140 may be a button that is labeled "Sign In" on the display 110. The object 140 may also have a tag or tags associated with it that include text information that, when processed by the screen reader 190, indicate that the object 140 is a button. In this situation, the screen reader 190 may utilize both the information in the tag(s) and the text label of the button to produce speech information that recites "Sign In button" when played by the sound system of the system 100. Of course, there are numerous other techniques that may be used to produce the speech information.

After receiving the current cursor focus position and the speech information for the object 140, in this example, the script 170 may then modify the speech information so that audio playback of the speech information spatially represents the location of the object 140 on the display 110. As discussed above, such a spatial sound field may assist the user 105 in building a mental image of the content of the display 110.

Such a spatial sound field may be produced in any number of ways. As one example, the script 170 may modify the speech information by determining relative respective playback volumes for the speech information for a plurality of channels in a multi-channel sound system (e.g., three-dimensional sound system) used to play the speech information, such as the sound system of the system 100. By way of example, the script 170 may determine such relative playback volumes using a volume control module 172, which may be included in the script 170 or, alternatively, may be implemented as a separate entity in the system 100.

For the object 140, for example, the volume control module 172 may modify the speech information so that it only plays through the speaker 128, indicating to the user that the object 140 is located at the top right corner of the screen. By way of additional example, the volume control module 172 may modify speech information for the object 130 such that it only plays back through the speaker 124, indicating to the user 105 that the object 130 is located in the upper left corner of the display 110. As another example, the volume control module 172 may modify speech information for the object 160 so that it plays at equal volumes from all of the speakers 120-128, indicating to the user that the object 160 is located at the center of the display 110. As yet another example, the volume control module 172 may modify speech information for the object 150 so that it plays at equal volumes though speakers 120 and 122 only, indicating to the user that object 150 is located at the bottom-center of the display 110. The spatial sound field for each of the objects 130-160 may be automatically played as the user 105 navigates the content of the display 110.

Other techniques may be used to provide the user 105 with a spatial sound field. For example, for systems that do not have a three-dimensional sound system, the speech information may be modified in other ways to provide spatial information to the user. For instance, in a system with two audio channels (i.e., left and right), the script 170 may modify the speech information to adjust the volume for each channel (e.g., using the volume control module 172) to indicate the horizontal position of an object on the display 110 to the user 105. In this situation, the script 170 may also modify the speech information by injecting noise into the speech information where the amount of noise injected indicates a relative vertical position of an object on the display 110. For instance, no noise may be injected for objects located at the bottom of display 110, while an upper level of noise may be injected for objects located at the top of the display.

Still other techniques may be used to provide spatial feedback to the user 105. For instance the playback volume of the speech information may be used to indicate an object's vertical position on the display 110. In such an approach, speech information for objects at the bottom of the display 110 (e.g., spatially closer to the user) may be played at higher volumes than speech information for objects located at the top of the display. Alternatively, the playback volume of the speech information may be modified to indicate certain types of objects on the display 110. For instance, speech information for the object 160 (POPUP) may be played at a relatively louder volume than other speech information to indicate to the user 105 that the object 160 is a popup window or dialog box.

An additional approach that may be used, such as for systems having only a mononural sound system, is to have the script 170 modify the speech information to include periodic tones to indicate the relative position of objects on the display 110. For instance a first tone may be used to indicate the horizontal position of an object, while a second tone (that, for the user 105, is readily distinguishable from the first tone) may be used to indicate the vertical position of the object. In such an approach, the frequency of occurrence at which the respective periodic tones are included in the speech information may be varied to indicate to the user 105 the relative horizontal and vertical positions of the object associated with the speech information being played. As an example, such tones may be added to the speech information using a tone generator 174 included in the script 170. Alternatively, the tone generator 174 may be implemented as a separate entity from the script. In certain embodiments, the tone generator 174 may also be adapted to include noise in the speech information, as was discussed above.

Figure 2:
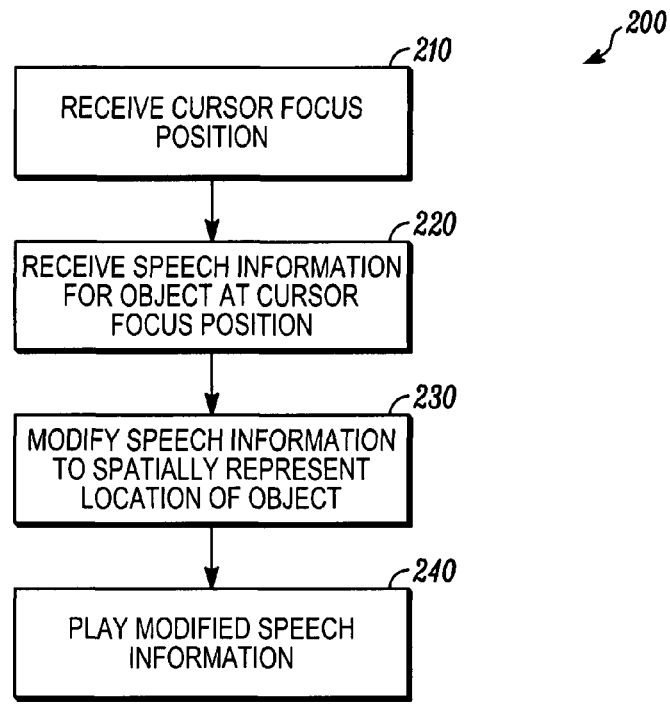
FIG. 2 is a flowchart illustrating an example method for spatial sound generation.

FIG. 2 is a flowchart illustrating an example method 200 for providing spatial sound information for a display. The method 200 will be described with further reference to the system 100 illustrated in FIG. 1, which may be used to implement the method 200.

The method 200 includes, at block 210, receiving an indication of a cursor focus position from, for example, the cursor tracking application 180, where the cursor focus position corresponds with a location of one of the objects 130-160 on the display device 110. As discussed above, the cursor focus position may also be received from the operating system 185, for example. The method 200 also includes, at block 220, receiving speech information associated with the object from, for example, the screen reader 190. As discussed above, such speech information may take the form of audio files or text-to-speech information. The method 200 further includes, at block 230, modifying the speech information based on the cursor focus position so that the modified speech information spatially represents the location on the display device. The speech information may be modified in any number of fashions, such as those described above, for example. The method 200 still further includes, at block 240, playing the modified speech information through a sound system, such as a mononural, multi-channel or three-dimensional sound system, such as in the fashions described above or using any other appropriate technique.

Figure 3:
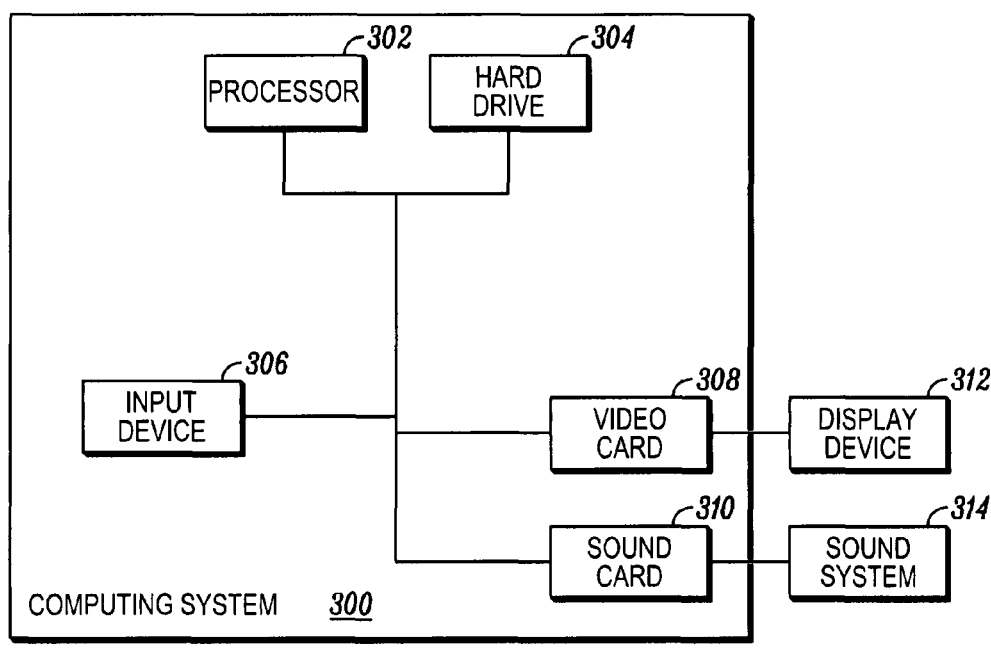
FIG. 3 is a block diagram of an example apparatus that may be used to implement spatial sound generation.

FIG. 3 is a block diagram of an apparatus that may be used to provide a spatial sound field to a user for content included in a display. The apparatus of FIG. 3 includes a computing system 300. The computing system 300 includes a processor 302 that may be used to execute machine readable instructions stored on a hard drive 304. With reference to FIG. 1, the hard drive may have instructions stored thereon for implanting the script 170, the cursor tracking application 180, the operating system 185 and the tone generator 190, for example. Such machine readable instructions, when executed by the processor 302, may implement the approaches for providing spatial sound information described above. The computing system 300 also includes an input device 306 (e.g., a keyboard) that may be used by a user to interact with the computing system 300, such as to navigate display content. Such display content may be displayed by the computing system 300 using a video card 308 and a display device 312 coupled with the computing system 300. The computing system 300 may play a spatial sound field, such as described above, using a sound card 310 and a sound system 314. The sound system 314 may be a single or multi-channel sound system, as was described above.

The techniques described above allow for providing spatial sound information for displayed content in real-time. These techniques may be advantageous as they may not be dependent on display resolution or require substantial recoding of content if changes are made to that content. Of course other benefits and advantages of the above described approaches exist.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
    receiving an indication of a cursor focus position, wherein the cursor focus position corresponds with a location on a display device;
    receiving speech information associated with an object situated at the location on the display device; and
    modifying the speech information based on the indication of the cursor focus position including injecting noise into the speech information such that the modified speech information spatially represents the location on the display device.

2. The method of claim 1, wherein receiving the indication of the cursor focus position comprises receiving the indication from an operating system running on a computing device that is operationally coupled with the display device.

3. The method of claim 1, wherein receiving the speech information comprises receiving text-to-speech conversion data from a screen reader.

4. The method of claim 1, wherein receiving the speech information comprises receiving text-to-speech conversion data from a screen reader, and wherein the text-to-speech conversion data is produced from one or more tags associated with the object situated at the location on the display device.

5. The method of claim 1, wherein modifying the speech information further comprises determining relative respective playback volumes for the speech information for a plurality of channels in a multi-channel sound system used to play the speech information.

6. The method of claim 1, wherein modifying the speech information further comprises modifying a volume level of the speech information for at least one channel of a plurality of channels of a three-dimensional sound system used to play the speech information.

7. The method of claim 1, wherein modifying the speech information further comprises increasing a volume level of the speech information to indicate a specific type of display feature for the object.

8. The method of claim 7, wherein modifying the speech information further comprises adding at least one of a periodic tone, a sound file and a sound effect to the speech information.

9. A system comprising:
    a computing device;
    a display device operationally coupled with the computing device; and
    a multi-channel sound system operationally coupled with the computing device,
    wherein the computing device comprises a storage device having machine readable instructions stored thereon that, when executed by the computing device, provides for:
        receiving an indication of a cursor focus position, wherein the cursor focus position corresponds with a location on the display device;
        receiving speech information associated with an object situated at the location on the display device;
        modifying the speech information based on the indication of the cursor focus position including injecting noise into the speech information such that the modified speech information spatially represents the location on the display device; and
        playing the modified speech information with the multi-channel sound system.

10. The system of claim 9, wherein the multi-channel sound system is a three-dimensional sound system.

11. The system of claim 9, wherein receiving the indication of the cursor focus position comprising receiving the indication from an operating system running on the computing device.

12. The system of claim 9, wherein receiving the speech information comprise receiving text-to-speech conversion data from a screen reader, and wherein the text-to-speech conversion data is produced from one or more tags associated with the object situated at the location on the display device.

13. The system of claim 9, wherein modifying the speech information comprises determining relative respective playback volumes for a plurality of channels in a multi-channel sound system.

14. An apparatus comprising:
a non-transitory machine readable medium having instructions stored thereon, wherein the instructions, when executed by a computing device, provide for:
receiving an indication of a cursor focus position, wherein the cursor focus position corresponds with a location on a display device operationally coupled with the computing device;
receiving speech information associated with an object situated at the location on the display device; and
modifying the speech information based on the indication of the cursor focus position including injecting noise into the speech information such that the modified speech information spatially represents the location on the display device.

15. The apparatus of claim 14, wherein modifying the speech information further comprises modifying a volume level of the speech information for at least one channel of a plurality of channels of a three-dimensional sound system, and wherein the three-dimensional sound system is operationally coupled with the computing device.

16. The medium of claim 14, wherein modifying the speech information further comprises increasing a volume level of the speech information to indicate a specific type of display for the object.

17. The medium of claim 14, wherein modifying the speech information further comprises modifying the playback speed of the speech information.

18. The medium of claim 14, wherein modifying the speech information further comprises adding periodic tones to the speech information.

* * * * *